Patented June 23, 1931

1,811,809

UNITED STATES PATENT OFFICE

KURT SCHWARZKOPF, OF TEMPELHOF, NEAR BERLIN, GERMANY

PULVERULENT PREPARATION FOR THE PRODUCTION OF A RINSING LIQUID FOR THE AFTER TREATMENT OF WASHED ANIMAL FIBERS, WOOLEN OR SILKEN FABRICS, AND ESPECIALLY THE HAIR OF THE HEAD

No Drawing. Application filed July 17, 1930, Serial No. 468,730, and in Germany May 24, 1928.

An addition of acid, such as acetic acid, to the water employed for rinsing animal fibers (fine woollen or silken fabrics) and especially the hair of the head after washing, is beneficial to the effect of the washing by imparting an increased lustre of the washed materials, or the hair. Commercial acetic acid, and also pure lemon juice, are mostly employed for this purpose, but as the experience necessary for avoiding an excess or insufficiency of acid in the rinsing water is not possessed by everyone, it seems advantageous to place on the market a preparation of constant composition and effectiveness.

It has now been ascertained that, owing to their strong hygroscopic properties, the technical treatment of pure pulverized citric acid, and its equivalent tartaric acid, is rendered difficult by the circumstance that the resulting moist lumps are so hard that they cannot be crushed without considerable force. Moreover, the powder always sinters together again through the action of atmospheric moisture.

From exhaustive attempts to eliminate this troublesome phenomenon I have ascertained—and this forms the characteristic of the invention—that the hygroscopic properties of citric and tartaric acids can be removed by mixing them with non-hygroscopic weak acids, free from water of crystallization, such as boric acid, salicylic acid and the like. Consequently, the citric or tartaric acid can be obtained in the form of a light powder, which remains permanently in a loose condition, so that its treatment and storage no longer encounter any difficulties.

The most favourable effect is obtained with a mixture ratio of 50% of citric, or tartaric, acid, to 50% of boric acid.

I claim:—

1. A pulverulent preparation for the production of a rinsing liquid for the after-treatment of washed animal fibers (woollen or silken fabrics) and especially the hair of the head, composed of a mixture of an organic acid and a non-hygroscopic acid having no influence on the chemical properties thereof.

2. A pulverulent preparation for the production of a rinsing liquid for the after-treatment of washed animal fibers (woollen or silken fabrics) and especially the hair of the head, composed of a mixture in substantially equal parts of an organic acid and a non-hygroscopic acid having no influence on the chemical properties thereof.

KURT SCHWARZKOPF.